United States Patent Office 2,913,324
Patented Nov. 17, 1959

2,913,324

SULFOETHYL CARBOXYLIC ACID ESTER PLANT GROWTH REGULANTS

Milton Kosmin, Dayton, Ohio, assignor to Monsanto Chemical Company, St. Louis, Mo., a corporation of Delaware No Drawing. Application May 16, 1955
Serial No. 508,770

9 Claims. (Cl. 71—2.6)

This invention provides new, hitherto unknown sulfoalkyl esters of certain polycyclic-aryl- and -aryloxyalkanoic acids, methods of preparing the same, plant growth regulant compositions comprising the new esters, and methods of regulating or controlling plant growth in which such compositions are used.

It is known that a number of aryl- and aryloxyalkanoic acids produce useful growth responses when they are applied to living plant organisms. These acids which evoke physiological and morphological plant responses are known as plant growth regulants. The useful applications of such acids are varied, the effect produced being dependent on the time of application and the concentration of compound applied to the plant; they include (1) stimulation of germination; (2) stimulation of root formation and growth; (3) inhibition of sprouting; (4) reduction of the number of set fruit; (5) induction of parthogenesis; (6) delay or prevention of fruit or leaf drop; (7) defoliation; etc. Applied at higher concentrations, these plant growth regulants frequently are effective herbicides, and it is a feature of this type of herbicide that its action is usually found to be selective, i.e., applied at the same concentration to each of two different plant species, a plant growth regulant may produce injury leading to death of one species, while the other plant species remains substantially unharmed.

The plant growth regulant compounds have found wide applications, but it has been found that these acids and their derivatives suffer from various disadvantages which complicate and render more difficult their use, and which have been the source of much study. The free acids are effective in the desired applications, but suffer from the disadvantages of lack of water-solubility and also from an effectiveness rather more instantaneous and powerful than is ordinarily desired. It appears preferable to apply to plants some form of derivative of the acid, which is hydrolyzed to the free acid in situ, producing a gentler and more controlled action. The alkali and ammonium salts of the acids are usually water-soluble, at least to some extent, but these salts have been found to be quite ineffective as compared with the free acids, perhaps because of lack of sufficient fat-solubility, a property which is apparently needed for effective penetration of the cells of the plants. Usually, therefore, these acids are applied to plants in the form of organic esters of the acids. The esters in common use hitherto, however, have suffered from the disadvantage of high "biological volatility," i.e., the esters tend to volatilize from the plants to which they have been applied and exert serious toxic effects on adjacent vegetation. It has been found that esters of these acids can be prepared with either alcohol, i.e., alkoxyalkanols, and these latter esters do not exhibit the high biological volatility of previous esters; however, the esters of the plant growth regulant acids with alkoxyalkanols are not water-soluble, and thus must be applied to vegetation either as solutions in organic solvents, which is an expensive and undesirable method, or as emulsions, i.e., a composition comprising an oil-in-water emulsion of the ester. Such emulsions are difficult to formulate and tend to be unstable, i.e., at lower temperatures, the emulsion may freeze, and on thawing, the oil and water components of the emulsion separate and no longer form a homogeneous mixture. Furthermore, only low concentrations of the esters can usually be held in emulsion form.

It is an object of this invention to provide new esters of polycyclic-aryl- and -aryloxyalkanoic plant growth regulant acids. It is a further object of this invention to provide new esters of polycyclic-aryl- and -aryloxyalkanoic plant growth regulant acids which are water-soluble. It is a further object of this invention to provide esters of polycyclic-aryl- and -aryloxyalkanoic plant growth regulant acids which have low "biological volatility." Still another object of this invention is to provide new and improved plant growth regulant compositions.

These and other objects of the invention are provided by the following invention wherein there are prepared sulfoesters of the formula

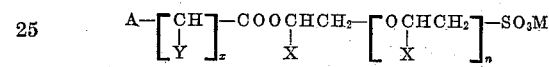

where A is selected from the class consisting of polycyclic-aryl and polycyclic-aryloxy radicals, Y is selected from the class consisting of hydrogen, the methyl radical, and chlorine, X is selected from the class consisting of hydrogen and the methyl radical, $x$ is a number of from 1 to 5, $n$ is a number of from 0 to 14, and M is a water-solubilizing cation.

Compounds having the above formula are readily obtainable by the condensation of the appropriate hydroxyalkanesulfonic acid or (hydroxyalkoxy)alkanesulfonic acid, e.g., isethionic acid, 2-methylisethionic acid, or the hydroxy ether of such an acid and a polyalkylene glycol, or a water-soluble salt thereof, with the appropriate polycyclic-aryl- or -aryloxyalkanoic acid or acyl halide thereof substantially according to the scheme:

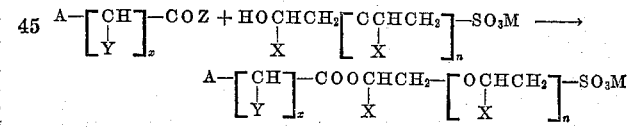

where A, X, Y, M, $x$ and $n$ are as defined above and Z denotes a halogen atom or the —OH radical.

By "polycyclic-aryl" is meant in the present case the radicals of polycyclic hydrocarbons containing benzoid unsaturation, including:

Carbocyclic totally benzenoid aromatic compounds such as naphthalene:

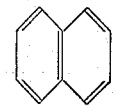

Carbocyclic partially hydrogenated aromatic compounds such as acenaphthene:

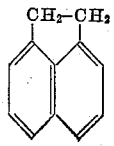

Heterocyclic aromatic compounds containing conjugated unsaturation such as indole:

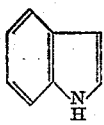

and the alkyl- and chloro-substituted products thereof.

One class of polycyclic-aryl- and -aryloxyalkanoic acids and acyl halides thereof having the above formula and useful for the present purpose are acetic acid and acetyl halide derivatives. Examples of suitable acids of this type are polycyclic-arylacetic acids exemplified by:

Carbocyclic aromatic compounds such as:
    1-naphthaleneacetic acid,
    9-anthraceneacetic acid,
    4-phenanthreneacetic acid,
    9-fluoroeneacetic acid,
    1-acenaphtheneacetic acid,
    1,2,3,4-tetrahydro-6-naphthaleneacetic acid,
Carbocyclic alkylaromatic compounds such as:
    5-methyl-1-naphthaleneacetic acid,
Carbocyclic chloroaromatic compounds such as:
    4-chloro-1-naphthaleneacetic acid,
Heterocyclic aromatic compounds such as:
    3-indoleacetic acid,
    2-benzofuranacetic acid
    3-thianaphtheneacetic acid,
Heterocyclic alkylaromatic compounds such as:
    5-methyl-3-indoleacetic acid, etc.

Other suitable acids of this type are polycyclic-aryloxyacetic acids, as exemplified by (2-naphthyloxy)acetic acid, (5-acenaphthenyloxy)acetic acid, (5-methyl-2-naphthyloxy)acetic acid, (3-chloro-2-naphthyloxy)acetic acid, (1,3-dichloro-2-naphthyloxy)acetic acid, (1,3,4-trichloro-2-naphthyloxy)acetic acid, (3-thianaphthenyloxy)acetic acid, (5-methyl-3-benzofuryl)acetic acid, etc.

Another class of suitable polycyclic-aryl- and -aryloxyalkanoic acids of the above formula comprises the 3-(polycyclic-aryl)propionic acids, which are named as arenepropionic acids, e.g., 1-naphthalenepropionic acid, 1-phenanthrenepropionic acid, 3-indolepropionic acid, 4-chloro-1-naphthalenepropionic acid, etc.; and 3-(polycyclic-aryloxy)propionic acids, which are named accordingly, such as 3-(1-naphthyloxy)propionic acid, 3-(2-benzofuryloxy)propionic acid, 3-(1,3,4-trichloro-2-naphthyloxy)propionic acid, etc.

The 2-(polycyclic-aryl)- and 2-(polycyclic-aryloxy)-propionic acids of the above formula comprise such compounds as α-methyl-1,2,3,4-tetrahydro-5-naphthaleneacetic acid, α-methyl-4-anthraceneacetic acid, α-methyl-5-isopropyl-1-naphthaleneacetic acid, α-methyl-8-chloro-2-naphthaleneacetic acid, α-methyl-3-indoleacetic acid, 2-(2-naphthyloxy)propionic acid, 2-(2-benzofuryloxy)propionic acid, etc.

The polycyclic-aryl- and -aryloxybutyric acids of the above general formula include such compounds as 1-naphthalenebutyric acid, α-methyl-1-naphthalenepropionic acid, β-methyl-1-naphthelenepropionic acid, 1-acenaphthenebutyric acid, α-methyl-1-phenanthrenepropionic acid, 2-benzofuranbutyric acid, 5-methyl-3-indolebutyric acid, 3-(1,3,4-trichloro-2-naphthyloxy)-2-methylpropionic acid, etc. Also included by the above general formula are valeric acid derivatives such as α-methyl-1-naphthalenebutyric acid, 4-(1-naphthyloxy)valeric acid, 1-naphthalenevaleric acid, etc.

Isethionic acid compounds having the above formula and reactive with the above aryl- and aryloxyalkanoic acids to yield the present improved plant regulant esters are isethionic acid, 2-methylisethionic acid and the water-soluble salts thereof, e.g., the alkali metal isethionates or 2-methylisethionates such as sodium, potassium or lithium isethionate or 2-methylisethionate, ammonium isethionate or 2-methylisethionate, organic amine salts of the isethionates such as the dimethylamine, the butylamine, the triethylamine, the ethanolamine, the isopropanolamine, the tri-n-propanolamine or the morpholino salts of isethionic or 2-methylisethionic acid. Hydroxy ethers of such isethionic acid compounds obtainable, e.g., by reaction of said acid compounds with ethylene glycol, polyalkylene glycols, or with ethylene oxide are also useful in the preparation of the present esters; as examples of such hydroxy ethers may be mentioned: 2-(2-hydroxyethoxy)ethanesulfonic acid and water-soluble salts thereof, the hydroxy ethers obtainable by reaction of isethionic acid or 2-methylisethionic acid or the salts thereof with diethylene glycol, pentaethylene glycol, octaethylene glycol or pentadecaethylene glycol, etc. The useful polyalkylene glycol ethers may also be prepared by condensing ethylene oxide or isopropylene oxide with the isethionic acid or 2-methylisethionic acid.

Compounds obtainable by the condensation of said aryl- and aryloxyalkanoic acids and said isethionic acid compounds are, i.e., salts of 2-sulfoethyl or 2-sulfopropyl carbocyclic or heterocyclic polycyclic-aryl-, alkyl-polycyclic-aryl-, chloro-polycyclic-aryl-, polycyclic-aryloxy, alkyl-polycyclic-aryloxy-, and chloro-polycyclic-aryloxy-acetates, -propionates, -α-methylacetates, -butyrates, -α-methylpropionates, -β-methylpropionates, or -valerates.

As examples of such 2-sulfoethyl or 2-sulfopropyl carbocyclic polycyclic-arylacetates may be mentioned:

2-sulfoethyl 2-naphthaleneacetate,
2-(sodium sulfo)ethyl 1-naphthaleneacetate,
2-(potassium sulfo)ethyl 9-anthraceneacetate,
2-(ammonium sulfo)ethyl 1-phenanthreneacetate,
Diethanolamine salt of 2-sulfoethyl 1-naphthaleneacetate,
Trimethylamine salt of 2-sulfoethyl 4-phenanthreneacetate,
2-(sodium sulfo)ethyl 9-fluoreneacetate,
2-(lithium sulfo)ethyl 1-acenaphtheneacetate,
Diethylenetriamine salt of 2-sulfoethyl 1,2,3,4-tetrahydro-6-naphthaleneacetate.

As examples of such 2-sulfoethyl or 2-sulfopropyl heterocyclic polycyclic-arylacetates may be mentioned:

2-sulfoethyl 3-indoleacetate,
2-(ammonium sulfo)ethyl 3-benzofuranacetate,
2-(sodium sulfo)ethyl 3-thianaphtheneacetate,
Dibutylamine salt of 2-sulfoethyl 3-indoleacetate,
Morpholine salt of 2-sulfoethyl 3-thianaphtheneacetate.

As examples of such 2-sulfoethyl or 2-sulfopropyl carbocyclic alkyl-polycyclic-arylacetates may be mentioned:

2-sulfoethyl 5-methyl-1-naphthaleneacetate,
2-(potassium sulfo)propyl 3-methyl-5-acenaphtheneacetate,
Isopropanolamine salt of 2-sulfoethyl 8-methyl-1-naphthaleneacetate,
Triethanolamine salt of 2-sulfopropyl 9-methyl-1-phenanthreneacetate,
Morpholine salt of 2-sulfopropyl 5-isopropyl-1-naphthaleneacetate.

Examples of such 2-sulfoethyl or 2-sulfopropyl heterocyclic alkyl-polycyclic-arylacetates are:

2-sulfopropyl 5-methyl-3-indoleacetate,
2-(lithium sulfo)ethyl 5-propyl-3-benzofuranacetate,
2-(sodium sulfo)propyl 5-methyl-3-indoleacetate,
Dibutylamine salt of 2-sulfoethyl 5-ethyl-3-thianaphtheneacetate,
Diethylenetriamine salt of 2-sulfoethyl 5-butyl-3-indoleacetate.

Examples of 2-sulfoethyl or 2-sulfopropyl carbocyclic and heterocyclic chloro-polycyclic-arylacetates are:

2-sulfoethyl 4-chloro-1-napthaleneacetate,
2-(sodium sulfo)ethyl 8-chloro-1-napthaleneacetate,
2-(sodium sulfo)ethyl 9-chloro-1-phenanthreneacetate,
2-(potassium sulfo)ethyl 8-chloro-1,2,3,4-tetrahydro-5-naphthaleneacetate,
2-sulfoethyl 5-chloro-3-indoleacetate,
Morpholine salt of 2-sulfopropyl 8-chloro-1-napthaleneacetate,
Triethanolamine salt of 2-sulfoethyl 9-chloro-1-acenaphtheneacetate,
Trimethylamine salt of 2-sulfoethyl 2-chloro-5-benzofuranacetate.

The 2-sulfoethyl or 2-sulfopropyl carbocyclic and heterocyclic polycyclic-aryloxy-, alkyl-polycyclic-aryloxy- and chloro-polycyclic-aryloxyacetates are exemplified by:

2-sulfoethyl (1-naphthyloxy)acetate,
2-sulfopropyl (2-naphthyloxy)acetate,
2-(sodium sulfo)ethyl (1-naphthyloxy)acetate,
2-(ammonium sulfo)ethyl (9-anthryloxy)acetate,
2-(sodium sulfo)ethyl (4-phenanthryloxy)acetate,
2-(sodium sulfo)ethyl (5-acenaphthenyloxy)acetate,
2-(sodium sulfo)ethyl (3-indolyloxy)acetate,
2-sulfoethyl (3-thianaphthenyloxy)acetate,
Isopropanolamine salt of 2-sulfoethyl (2-naphthyloxy)acetate,
n-Butylamine salt of 2-sulfoethyl (1-acenaphthenyloxy)acetate,
Triethylenetetramine salt of 2-sulfoethyl (5-benzofuryloxy)acetate,
Morpholine salt of 2-sulfoethyl (9-fluorenyloxy)acetate,
2-(potassium sulfo)ethyl (4-methyl-2-naphthyloxy)acetate,
2-(sodium sulfo)ethyl (8-isopropyl-1,2,3,4-tetrahydro-5-naphthyloxy)acetate,
2-(sodium sulfo)ethyl (5-methyl-1-acenaphthenyloxy)acetate,
2-sulfoethyl (3-ethyl-5-benzofuryloxy)acetate,
Triethylamine salt of 2-sulfoethyl (4-butyl-2-naphthyloxy)acetate,
Tri-n-propylamine salt of 2-sulfoethyl (1-methyl-9-fluorenyloxy)acetate,
Diethylenetriamine salt of 2-sulfoethyl (5-butyl-3-thianaphthenyloxy)acetate,
2-(sodium sulfo)propyl (8-chloro-2-naphthyloxy)acetate,
2-sulfoethyl (3-chloro-2-naphthyloxy)acetate,
2-(ammonium sulfo)ethyl (1,3-dichloro-2-naphthyloxy)acetate,
2-(sodium sulfo)ethyl (1-chloro-5-acenaphthenyloxy)acetate,
2-(sodium sulfo)ethyl (6-chloro-3-indolyloxy)acetate,
Diethanolamine salt of 2-sulfoethyl (5-chloro-2-naphthyloxy)acetate,
Dibutylamine salt of 2-sulfoethyl (1,4-dichloro-2-naphthyloxy)acetate,
Trimethylamine salt of 2-sulfoethyl (1-methyl-3,4-dichloro-2-naphthyloxy)acetate,
Isopropanolamine salt of 2-sulfoethyl (1,3,4-trichloro-2-naphthyloxy)acetate,
Morpholine salt of 2-sulfoethyl (5-chloro-2-benzofuryloxy)acetate.

Examples of presently provided 3-(polycyclic-aryl)-, and 3-(polycyclic-arloxy)propionates are:

2-sulfoethyl 3-(1,2,3,4-tetrahydro-6-naphthyloxy)propionate,
2-(sodium sulfo)ethyl 1-acenaphthenepropionate,
2-(potassium sulfo)ethyl 3-(9-chloro-1-fluorenyloxy)propionate,
2-(lithium sulfo)propyl 3-(1,3,4-trichloro-2-naphthyloxy)propionate,
2-(ammonium sulfo)ethyl 4-methyl-9-phenanthrenepropionate,
n-Butylamine salt of 2-sulfoethyl 4-chloro-1-anthracenepropionate,
Dibutylamine salt of 2-sulfoethyl 5-chloro-2-indolepropionate,
Trimethylamine salt of 2-sulfoethyl 1-butyl-5-acenaphthenepropionate,
Diethylenetriamine salt of 2-sulfopropyl 3-(5-methyl-3-indolyloxy)propionate,
Triethylenetetramine salt of 2-sulfoethyl 9-anthracenepropionate,
Morpholine salt of 2-sulfoethyl 2-benzofuranpropionate,
Ethanolamine salt of 2-sulfoethyl 2-methyl-5-benzofuranpropionate,
Diethanolamine salt of 2-sulfoethyl 3-(3-thianaphthenyloxy)propionate,
Triethanolamine salt of 2-sulfoethyl 3-(1-naphthyloxy)propionate.

Examples of 2-(polycyclic-aryl)- and 2-(polycyclic-aryloxy)propionates are:

2-(sodium sulfo)ethyl 2-(2-naphthyloxy)propionate,
2-(ammonium sulfo)ethyl 2-(1-acenaphthenyloxy)propionate,
2-(sodium sulfo)ethyl α-methyl-2-benzofuranacetate,
Morpholine salt of 2-sulfoethyl α,4-dimethyl-1-naphthaleneacetate,
Diisopropanolamine salt of 2-(5-chloro-2-naphthyloxy)propionate,
Di-n-butylamine salt of α-methyl-3-indoleacetate.

Examples of 3- and 4-(polycyclic-aryl)- and -(polycyclic-aryloxy)butyrates are:

2-sulfoethyl 5-chloro-3-thianaphthenebutyrate,
2-(sodium sulfo)propyl β-methyl-1-naphthalenepropionate,
2-(ammonium sulfo)ethyl α-methyl-3-thianaphthenepropionate,
Trimethylamine salt of 2-sulfoethyl 3-(9-fluorenyloxy)butyrate,
Diethylenetriamine salt of 2-sulfoethyl 2-methyl-3-(5-chloro-1,2,3,4-tetrahydro-8-naphthyloxy)propionate,
Isopropanolamine salt of 2-sulfoethyl 3-indolebutyrate.

Illustrative of the presently provided polycyclic-aryl- and -aryloxyvalerates are:

2-(sodium sulfo)ethyl γ-methyl-1-phenanthrenebutyrate,
2-(ammonium sulfo)ethyl 4-(5-acenaphthenyloxy)valerate,
Morpholine salt of 2-sulfoethyl β-methyl-5-benzofuranbutyrate,
Triisobutanolamine salt of 2-sulfoethyl 2-methyl-4-(7-chloro-2-naphthyloxy)butyrate.

The above compounds are prepared by employing isethionic acid or 2-methylisethionic acid or the salts thereof as the hydroxy component in the preparation of the present esters. As has been herein stated, the isethionic acid compounds may be replaced by hydroxy ethers thereof, e.g., the mono- or polyethers of ethylene or isopropylene glycol and the isethionic or 2-methylisethionic compounds. As examples of esters of the polycyclic-aryl- and -aryloxyalkanoic acids and the monoalkylene glycol ethers of the isethionic acids may be mentioned:

2-(2-sodium sulfoethoxy)ethyl (2-naphthyloxy)acetate,
2-(2-ammonium sulfopropoxy)propyl 9-fluorenepropionate,
2-(2-sodium sulfoethoxy)ethyl 3-indoleacetate,
Triethanolamine salt of 2-(2-sulfoethoxy)ethyl 3-(3,4-dichloro-2-naphthyloxy)butyrate.

As examples of esters of the present polycyclic-aryl- and -aryl-oxyalkanoic acids with polyalkylene glycol ethers of isethionic or 2-methylisethionic acid may be listed:

The sodium salt of the ester of 4-chloro-1-naphthaleneacetic acid and the diethylene glycol ether of isethionic acid.

The potassium salt of the ester of 3-indolepropionic acid and the pentaethylene glycol ether of 2-methylisethionic acid.

The morpholine salt of the ester of 4-(4,5-dichloro-2-naphthyloxy)butyric acid and the decaisopropylene glycol ether of isethionic acid.

In preparing the present sulfoalkyl esters I operate substantially as follows: I heat a mixture of the isethionic acid compound, e.g., isethionic or 2-methylisethionic acid or salt thereof, with the polycyclic-aryl- or -aryloxyalkanoic acid compound at a temperature of from, say, 100° C. to below the decomposition point of the reaction mixture, until formation of the sulfoalkyl ester has occurred. An inert diluent may or may not be employed. Since the reaction occurs by condensation of one mole of the isethionic acid compound with one mole of the polycyclic-aryl- or polycyclic-aryloxyalkanoic compound, equimolar proportions of the reactants generally may be employed. In practice, it may be preferable to use a slight excess of whichever component is more readily obtainable in order to assure complete reaction of the less readily obtainable reactant. The reaction may be effected at ordinary atmospheric, sub-atmospheric or super-atmospheric pressures. Generally, in order to permit smooth and rapid reaction at the higher temperatures, e.g., at temperatures of from, say, 200° C. to 300° C., it is advantageous to operate at diminished pressure, say, at a pressure of from 10 to 100 mm. of mercury. Catalysts may or may not be employed. Useful catalysts comprise organic or inorganic acid or basic materials, e.g., sulfuric acid, 4-toluenesulfonic acid, sodium methoxide, sodium hydroxide, etc. The reaction product, i.e., the sulfo ester, is separated from the resulting reaction mixture by simply removing any unreacted constituents, e.g., by distilling, decanting, washing or extracting. Generally the use of substantially equimolar proportions of the isethionic salt and the polycyclic-aryl- or -aryloxyalkanoic acid compound and heating at temperatures of from 200° C. to 300° C. for a time of, say, from a few minutes to several hours, assures complete reaction of both components so that the reaction product consists of the substantially pure, crystalline salt of the sulfoethyl ester. In this case, no further treatment of the product is required.

As may be apparent to those skilled in the art, use of isethionic acid or of 2-methylisethionic acid in the condensation reaction will result in the formation of the free sulfonic acid. While the free acid may be employed as the active ingredient in the formulation of plant growth regulant compositions, for ease in manipulation and storage, it is generally advisable to convert the 2-sulfoalkyl ester into the sulfonate. This may be effected by neutralizing the free sulfonic acid with an appropriate organic or inorganic basically reacting agent until a neutral product is obtained. Useful basic materials in the neutralizing step are alkali metal hydroxides or the basically reacting salts thereof, water-solubilizing alkyl or alkanolamines, ammonium hydroxide, or basically reacting salts thereof, morpholine, etc.

The present sulfoalkyl esters and the salts thereof are generally solid, stable, waxy to crystalline materials. The present salts are characterized by high water solubility, low volatility, and effectiveness in producing very desirable morphological and histological changes in plants to which these compounds are applied, as further described below.

The invention is further illustrated, but not limited, by the following examples:

*Example 1.—Preparation of 2-(sodium sulfo)ethyl (2-naphthoxy)acetate*

To a 500 ml. flask equipped with a mechanical stirrer, reflux condenser, and thermometer were charged 111.2 g. (0.55 mole) of (2-naphthoxy)acetic acid and 74.0 g. (0.5 mole) of sodium isethionate. The charge was heated for two hours at 250–255° C., during which time 7 ml. of water were evolved. At the end of the two hours, the flask contents were washed three times with acetone, filtered, and dried under vacuum. Analysis of the light pink, waxy product indicated that it contained about 74 percent of the desired, highly water-soluble 2-(sodium sulfo)ethyl (2-naphthoxy)-acetate.

*Example 2.—Preparation of 2-(sodium sulfo)ethyl 1-naphthaleneacetate*

To a flask equipped as described above were charged 111.7 g. (0.6 mole) of 1-naphthaleneacetic acid and 74.0 g. (0.5 mole) of sodium isethionate. About 7 moles of water were collected during the one and three-quarters hours the mixture was heated, at about 250° C. After cooling, the product was washed twice with acetone, filtered, and dried, dissolved in a small amount of water, precipitated from water solution by addition of ethanol, and dried under vacuum at 45° C. The product weighed 110.5 g.; when a sample was heated in a melting point tube, it began to shrink at 125° C., but had not actually melted at temperatures up to 260° C. The identity of the product with the desired sulfoester was confirmed by the following analysis:

|  | Found | Calculated for $C_{14}H_{13}NaO_5S$ |
| --- | --- | --- |
| Percent S | 10.14 | 10.18 |
| Percent C | 53.16 | 49.70 |
| Percent H | 4.14 | 5.23 |

On repetition of the above procedure, but starting with 180 g. of 1-naphthaleneacetic acid and 65 g. of sodium isethionate, the yield was 117 g. (84 percent of theoretical) of 2-(sodium sulfo)-ethyl 1-naphthaleneacetate, in the form of a white powder.

Similarly, there may be prepared 2-(sodium sulfo)ethyl 3-indoleacetate, by reaction of equimolecular quantities of 3-indoleacetic acid and sodium isethionate; 2-(sodium sulfo)propyl 5-acenaphtheneacetate, by reaction of 5-acenaphtheneacetic acid and sodium 2-methylisethionate; etc.

The selective herbicidal activity of the present sulfoalkyl esters is illustrated by the following example:

*Example 3.—Herbicidal testing*

Aluminum pan flats, filled with mixtures consisting of 2 parts of top soil which had been screened through a ¼" wire mesh and 1 part of sand, were seeded to representative broad-leaf plants such as buckwheat, radish and clover, and to grasses such as rye grass. The grass seeds were scattered randomly over one-third of the area of the soil surface and the seeds of the broad-leaf plants were randomly scattered over the remaining two-thirds of the soil surface. The seeds were then covered with a ⅜" layer of the soil. The seeded pans were placed in ½" of water and allowed to absorb moisture through the perforated bottom until the soil surface was completely moist. The pans were then transferred to a wet sandbench in the greenhouse for germination and growth. Respective 0.5 percent (by weight) aqueous solutions of 2-(sodium sulfo)ethyl (2-naphthyloxy) acetate (product I) and 2-(sodium sulfo)ethyl 1-naphthalene-acetate (product II) were prepared. When the test plants in the pan flats were from 10 days to 2 weeks old, the pans were sprayed respectively, by means of an atomizer, with 30 cc. of the solutions of products I and II. The sprayed pans of plants were then maintained in the greenhouse for 10 days. At the end of this time, observation of the sprayed plants showed the grass which had been sprayed with the solutions of products I and II to be entirely unharmed whereas broad-leaf plants which had been sprayed with the solutions of products I and II were completely dead.

Similar testing of product II at a concentration of 0.2 percent showed no injury to grass at this concentration, whereas broad-leaf plants were completely dead.

Product I, 2-(sodium sulfo)ethyl (2-naphthyloxy) acetate, was also found to possess pre-emergent herbicidal activity when applied in aqueous solutions at the rate of 2½ lbs. per acre.

The very good water-solubility of the present esters is of economic significance in that it permits easy and inexpensive formulation. Unlike the prior water-insoluble ble esters of the "2,4–D" or "2,4,5–T" type, the present sulfoethyl esters need not be dispersed or emulsified for use as sprays. They may be packaged in solid form for the user to incorporate into water in the useful concentrations, or they may be sold in concentrated aqueous solutions which need be merely diluted with water prior to use. Neither organic solvents, emulsifying agents, or special formulating equipment is required.

While the present sulfoethyl esters are most advantageously employed as herbicides in aqueous solution, they may also be incorporated into solid carriers such as clay, talc, pumice and bentonite to give herbicidal decompositions which may be applied to the living plants or to soil surfaces which are to be freed from broad-leaf plant growth. The present esters may also be mixed with liquid or solid agricultural pesticides, e.g., insecticides and fungicides. For specialty uses, oil-in-water emulsions of the sulfoethyl esters may be prepared, employing either ionic or non-ionic emulsifying agents, e.g., the long chain polyalkylene glycols or the long chain alkyl sulfosuccinates.

Because of the very high herbicidal efficiency of the present sulfoethyl esters, they are present in the herbicidal sprays or dusts in only very low concentrations, for example, in concentrations of from 0.1 percent to 1.0 percent by weight. The sulfoethyl esters possess at least the heribcidal efficiency of the known polycyclic-aryl- and -aryloxyalkanoic acids such as the commercial products, 1-naphthaleneacetic acid, (2-naphthyloxy)acetic acid, methyl 1-naphthaleneacetate, and 5-methylindolepropionic acid, but their use requires neither special formulations nor precautions to prevent injury to wanted plants in adjacent areas.

In general agricultural practice, the chief herbicides in use are the "2,4–D" and "2,4,5–T" types (-polychlorophenoxyalkanoic acid compounds), while the compounds of the type of the acids from which the present esters are derived, i.e., polycyclic-aryl- and -aryloxyalkanoic acids, are often preferred over the "2,4–D" type for plant growth regulator effects as discussed above in an earlier section of the instant disclosure. The "2,4–D" types, that is, can produce plant hormone, i.e., growth regulant, effects, but are so powerful that it is difficult to obtain the correct concentration to strike a balance between utter lack of effectiveness and toxic herbicidal effects. It has been found that the action of the polycyclic-aryl- and -aryloxyalkanoic acids such as 1-naphthaleneacetic and (2-naphthyloxy)acetic acids is more controllable, and these compounds and their available derivatives have therefore been adopted particularly in the production of such effects as the stimulation of rooting, the induction of flowering and fruit setting, especially parthenocarpic fruiting, as well as for prevention of fruit drop. Direct control of plant growth patterns in such manner is frequently, particularly in the production of parthenocarpy, dependent on the application of the plant growth regulant to a particular part, i.e., the flower, of the plant; as in the production of parthenocarpic fruiting of pineapples, this may be a hand operation, in which each plant is individually treated by application of the plant hormone. This type of application requires that an adequate concentration of the effective chemical composition be applied to that portion of the plant structure which is responsive to the treatment in the desired fashion. It is a particular feature of the present invention that it is possible to apply to the plant a concentrated aqueous solution of the present plant growth regulants, rather than the necessarily dilute concentration which would be produced by use of the emulsion technique, a solid which might blow away if the composition were applied as a dust, or a solution in an organic solvent, which could very well have toxic effects. It may be hypothesized that the present esters are slowly hydrolyzed to the acid after their application to the living plant; then a sufficiently low concentration of a sufficiently mild plant growth regulant is maintained available to the living plant for a sufficiently long time to produce the controlled results in plant response desired. The advantages of the present esters are further illustrated by the following examples:

*Example 4.—Treatment of tobacco*

The value of a tobacco crop is determined not only by the weight/acre but primarily by the size of the leaves obtained. Cultural practices then are directed towards increasing leaf size.

In tobacco growing the farmer permits the plant to reach a stage where the terminal bud has been converted to a flower head. The flower head is then pinched or cut off. This is called topping.

After topping, the uppermost lateral buds (suckers) develop. These are manually removed (suckered) which permits the leaves at the nodes to expand. Removal of the terminal bud and the first suckering encourages other suckers lower down to develop on the plant, and these too must be removed. In all, plants are treated, on the average, four times: one topping and three suckerings.

In this experiment the plants were topped with a linoleum cutter and a depression about one-half inch deep was scooped out. Test compounds were applied to this depression as follows:

I. Control: topped only
II. 100 mg. powdered 3-indoleacetic acid (IAA)
III. 100 mg. powdered 1-naphthaleneacetic acid (NAA)
IV. 10 drops of 5 percent aqueous solution of 2-(sodium sulfo)ethyl 1-naphthaleneacetate (NAA ester).

The plants were then kept in a greenhouse and allowed to grow to maturity under standard conditions of moisture and sunlight. They were then observed for appearance and size of the six top leaves, the leaves were stripped, and the suckers which had grown were then removed from the plants and weighed. The results were as follows:

|  | Condition of top leaves | Wt. of suckers, g. |
| --- | --- | --- |
| I (control) | Large number of very small leaves | 238 |
| II (IAA) | Few, moderately large leaves; epinasty | 9 |
| III (NAA) | ----do---- | 13 |
| IV (NAA ester) | Few, large, healthy leaves | 40 |

Epinasty, noted above in the observations of conditions of plants treated with the free plant growth regulant acids, is a plant response characterized by twisting of the bases of the leaves, which are bent and curled downward by the swelling of cells in the dorsal side of veins. Leaves suffering from treatment with an epinastic agent are generally narrowed and shortened, and exhibit excessive enlargement of veins. This epinastic response to treatment with plant growth regulants in the forms of the free acids, salts or alkyl esters has been reported in the literature previously.

The plants treated with the 2-(sodium sulfo)ethyl ester of 1-naphthaleneacetic acid, in contrast to the free acid, exhibited no epinasty, and the top leaves were not only in healthy condition, but were also visibly larger in area than those of the plants treated with the free acid. Sucker formation, however, had been substantially suppressed, as shown by the above data.

The present invention thus offers an important advance in the art of tobacco culture. A single treatment with the present isethionate esters can replace four manual operations (one topping, three suckerings), producing healthy plants with the very desirable enlargement of the upper leaves. The esters of the invention may be applied as described above, by topping the plant and applying an aqueous solution of the esters in the depression produced, or the application of the present esters to the plants could be facilitated by simply injecting the solution of the ester into the top of the plant, avoiding the topping procedure entirely. A further possibility consists of spraying a solution of the esters directly on the flower buds as they emerge. The terminal bud may be killed by this treatment, while sucker growth is suppressed; thus, in this further simplification of the method, the topping procedure may again be eliminated. Still another field of application for the present esters is application to plants prior to the appearance of buds, whereby flowering is inhibited for a period of time, and the period for vegetative growth increased. Further possible applications of the present esters will be readily evident to those skilled in the art.

In the above example, the desired crop was the plant leaf. For this reason, cultural practices include both removal of the plant stem tip and removal of lateral sucker growth. It is known that removal of the apex of a plant causes an increase in the growth of side shoots, i.e., the buds lower on the stem form branches and leaves, whereas without removal of the stem tip, these buds would remain essentially dormant. The phenomenon of control of the growth pattern of the plant by the stem tip is known as apical dominance, and is a plant auxin (i.e., hormone) effect. in tobacco culture, to cause all the "strength" of the plant to go into the leaves, the side shoots, i.e., suckers, are removed as well as the stem tip. In growth of other plants, the desired feature is the flower or fruit borne on side shoots, and it would be a desirable feature of a plant growth regulant to furnish a chemical treatment whereby the terminal bud of crop plants was killed or inactivated, so that production of side shoots and flowers was increaserd. In cotton, for example, it is known that infestation by certain types of insects actually increases the yield of cotton; these insects restrict their activities to devouring the terminal bud. The following experiment was therefore carried out:

*Example 5.—Treatment of cotton*

Cotton plants started in the greenhouse were transplanted to the field after the last frost. Several weeks after the transplanting, when the plants were about eight inches high, the plants were treated as follows: (1) controls: no treatment; (2) tip removed manually; (3) plant sprayed to run-off with a 100 parts per million aqueous solution of 2-sodium sulfo)ethyl (2-naphthyloxy)-acetate. After sixteen weeks, each plant was dug out and the number of bolls on the plant recorded. It was found that, whereas the controls averaged 44 bolls per plant, the plants from which the tip had been removed had an average number of bolls per plant of 63, which is a 50 percent increase over the control, and the plants which had been sprayed with the sulfoethyl (2-naphthyloxy)-acetate so as to cause the terminal bud to drop exhibited a 160 percent increase over the control, with an average of 115 bolls per plant.

The present esters may readily be applied to growing plants such as cotton, tobacco, etc., to elicit growth regulant responses as described above, by spraying the living plants with aqueous solutions of the esters; alternatively, the solutions of the esters may be applied directly to the flowering tip of the plants, for example. They may also be applied mixed with solid carriers, such as clay or a solid material which itself possesses agricultural activity, such as a fertilizer. The use of oil-in-water emulsions of the present esters for special purposes is also possible. The rates at which the present compounds are employed will depend, for example, on the method of application, i.e., whether the plant growth regulant composition is applied to individual stem tips or sprayed generally over the plant. Very low concentrations, i.e., from 50 to 200 parts per million, may be applied to produce the present growth regulating results. Other applications to the modification of plant growth patterns will be readily evident to skilled agricultural chemists. The present compounds may be applied in any of the uses to which the free acids, salts and lower-alkyl esters of the present polycyclic-aryl- and -aryloxyalkanoic acids may be put, i.e., to the thinning of fruit trees, forcing of flowering in pineapples, treating seeds to increase flower and fruit production, preventing sprouting of tubers, i.e., potatoes, in storage, etc.

While the above examples have described particular details and procedures for practicing the present invention, it will be understood that various modifications can be made without departing from the spirit of the invention.

What is claimed is:

1. A method of improving the quality of tobacco leaves and the number of bolls on cotton plants comprising applying to said plants an amount sufficient to inhibit the growth of the flowering tip of said plants of an aqueous solution of a compound selected from the class consisting of 2-(sodium sulfo)ethyl 1-naphthaleneacetate and 2-(sodium sulfo)ethyl (2-naphthyloxy)acetate.

2. The method of claim 1, wherein said plants are tobacco plants and said compound is 2-(sodium sulfo)-ethyl 1-naphthaleneacetate.

3. The method of claim 2, wherein said compound is applied to the depression produced by topping said plants.

4. The method of claim 2, wherein said compound is sprayed directly on the flowering buds of said tobacco plants as they emerge.

5. The method of claim 2, wherein said compound is applied to said tobacco plant prior to the appearance of the buds, whereby flowering is inhibited for a period of time, and the period for vegetative growth increased.

6. The method of claim 2, wherein about 10 drops of a 5% aqueous solution of said compound is applied to the depression produced by topping each of said plants.

7. The method of claim 1, wherein said plants are cotton plants and said compound is 2-(sodium sulfo)ethyl (2-naphthyloxy)acetate.

8. The method of claim 7, wherein the flowering tips of said cotton plants are treated with said compound.

9. The method of claim 7, wherein said plants are sprayed to run off with about a 100 p.p.m. aqueous solution of said compound.

References Cited in the file of this patent

UNITED STATES PATENTS

| | | |
|---|---|---|
| 2,179,209 | Daimler et al. | Nov. 7, 1939 |
| 2,396,513 | Jones | Mar. 12, 1946 |
| 2,523,228 | Mullison | Sept. 19, 1950 |
| 2,573,769 | Lambrech | Nov. 6, 1951 |
| 2,594,135 | Denny | Apr. 22, 1952 |
| 2,628,162 | Sanders et al. | Feb. 10, 1953 |
| 2,708,675 | Slagh | May 17, 1955 |

OTHER REFERENCES

Thompson et al.: Botanical Gazette, 107, 485 (1946).